United States Patent
Schmohl

(10) Patent No.: US 7,268,509 B2
(45) Date of Patent: Sep. 11, 2007

(54) ELECTRIC DRIVEN TOOL DEVICE

(75) Inventor: Michael Schmohl, Ammerbuch (DE)

(73) Assignee: Metabowerke GmbH, Nuertingen (DE)

( * ) Notice: Subject to any disclaimer, the term of this patent is extended or adjusted under 35 U.S.C. 154(b) by 355 days.

(21) Appl. No.: 10/510,693

(22) PCT Filed: Mar. 26, 2003

(86) PCT No.: PCT/EP03/03111

§ 371 (c)(1), (2), (4) Date: Oct. 8, 2004

(87) PCT Pub. No.: WO03/088470

PCT Pub. Date: Oct. 23, 2003

(65) Prior Publication Data

US 2005/0162112 A1 Jul. 28, 2005

(30) Foreign Application Priority Data

Apr. 16, 2002 (DE) ................. 102 16 836

(51) Int. Cl.
*H02P 7/00* (2006.01)

(52) U.S. Cl. .............. 318/434; 318/430; 318/432; 318/138; 318/439

(58) Field of Classification Search ........ 318/430–434, 318/700–811, 138, 439, 254
See application file for complete search history.

(56) References Cited

U.S. PATENT DOCUMENTS

| | | | |
|---|---|---|---|
| 6,166,502 A | 12/2000 | Pattok | |
| 6,646,411 B2 * | 11/2003 | Hirono et al. | 318/801 |
| 7,042,191 B2 * | 5/2006 | Hirono | 318/801 |
| 2002/0117992 A1 * | 8/2002 | Hirono et al. | 318/801 |

FOREIGN PATENT DOCUMENTS

| | | |
|---|---|---|
| DE | 34 47 354 | 7/1985 |
| DE | 31 25 157 | 10/1987 |
| DE | 37 09 983 | 10/1988 |
| DE | 196 29 564 | 1/1998 |
| DE | 199 44 194 | 3/2001 |
| WO | WO99 03 193 | 1/1999 |

* cited by examiner

*Primary Examiner*—Lincoln Donovan
*Assistant Examiner*—Tyrone Smith
(74) *Attorney, Agent, or Firm*—Paul Vincent

(57) ABSTRACT

The invention relates to an electric driven tool device, especially an electric hand-held tool device, comprising an asynchronous electric motor (2) or a brush-less synchronous electric motor and a computer-controlled motor control device (8). The invention is characterized by a frequency converter (4) which can be controlled by the motor control device, whereby a motor (drive) voltage can be applied to the motor (2), and with a current detector (10) which co-operates with the motor control device (8) and detects the motor current. The motor control device (8) is embodied in such a manner that, in a first phase of the motor operation, the frequency of the motor current is maintained in a constant manner up to a limiting current $I_{(grenz)}$ and, in a second phase of the motor operation, at loads above the load at which the motor current reaches the limiting current $I_{(grenz)}$, the frequency of the motor current is lowered in such a manner that the motor current is maintained at a constant value.

22 Claims, 1 Drawing Sheet

ELECTRIC DRIVEN TOOL DEVICE

This application is the national stage of PCT/EP03/03111 filed on Mar. 26, 2003 and also claims Paris Convention priority of DE 102 16 836.9 filed on Apr. 16, 2002.

BACKGROUND OF THE INVENTION

The invention concerns an electric driven tool device, in particular, a manual electric tool device, comprising an asynchronous electromotor or a brush-less synchronous electromotor, and a computer-controlled motor control means, i.e. with an, in particular, microprocessor-controlled control electronics.

Manual electric driven tool devices are mainly driven by electromotors having a current converter or commutator with carbon brushes. In particular, so-called universal motors are used. Carbon brushes are subject to constant wear and must be replaced after some time. Commutator motors of this type have almost linear performance characteristics up to a certain load. At higher loads, the motor rotational speed decreases and the motor current increases. There are also manual electric tool devices having a controlled commutator motor. The motor rotational speed is thereby kept constant with increasing load mostly via phase section control, such as e.g. in the electric tool device distributed by the applicant under the trade name "Vario-Constamatik". If the load of the motor exceeds a certain value, control via the control electronics is not possible, inevitably producing uncontrolled motor characteristics.

In so-called semi-stationary electric tool devices, such as e.g. circular saw benches, reciprocating table type planers, strip straightening machines etc. an asynchronous electromotor or a synchronous electromotor are conventionally used which are operated at the constant frequency of the motor drive voltage. The frequency used is, in particular, the mains frequency, in Europe 50 Hertz and in the U.S.A. 60 Hertz. DE 298 09 768 U1 discloses a semi-stationary electric tool device in the form of a circular saw bench, comprising an asynchronous electromotor or a synchronous electromotor, which is operated at a higher, constant frequency of 300 to 400 Hertz compared to the mains frequency by using a frequency converter. The rotational speed of the motor is therefore correspondingly higher and a downstream reducing gear is disposed in the drive motor.

DE 198 16 684 A1 discloses a manual electric tool device comprising an electromotor without carbon brushes. The device unit contains the drive motor and the electric components of the electromotor control, which are directly required for control thereof and has a separate external current supply unit.

It is the underlying purpose of the invention to produce an electric tool device which has linear performance characteristics similar to those of a commutator motor comprising carbon brushes but without the need for a commutator carbon brush system, which is susceptible to wear. The motor control device should function without expensive sensors, such as e.g. tachometer sensors or Hall sensors.

SUMMARY OF THE INVENTION

This object is achieved in a manual electric tool device of the above-mentioned type, which is characterized by a frequency converter, which can be controlled by the motor control means for applying a motor (drive) voltage to the motor, and with a current detector which detects the motor current and cooperates with the motor control device, wherein the motor control means is designed such that in a first phase of motor operation at motor currents up to a limit current $I_{(limit)}$, the frequency of the motor current is kept constant and in a second phase of motor operation at loads above that load at which the motor current reaches the limit current $I_{(limit)}$, the frequency of the motor current is reduced such that the motor current is kept at a constant value. The above-mentioned term "limit current" $I_{(limit)}$ designates a drive current strength below the tilting point, i.e. below that current strength at which the electromotor stops. The limit current is preferably selected to be 5 to 15% less than the tilting point current. For powerful electromotors, the limit current $I_{(limit)}$ may be between 15 and 20 A and for weak electromotors 4-8 A.

The drive motor is operated at a constant frequency F up to a certain load which corresponds to the limit current $I_{(limit)}$. This produces an almost horizontal motor characteristic dependence if the motor rotational speed N is plotted in dependence on the load or the torque M produced by the motor. As the load increases, i.e. the torque M increases and the motor rotational speed N decreases only slightly due to the so-called slip of the electromotor. This first operating region corresponds, in principle, to the normal characteristic dependence of an uncontrolled synchronous or asynchronous electromotor at loads at sufficient separation from the so-called tilting point. On the other hand, this region of the characteristic dependence also corresponds approximately to the characteristic dependence of a universal motor (series-characteristic motor) having a commutator carbon brush system and regulated via phase section control.

If the load or the torque exerted by the electromotor corresponds to a certain value $I_{(limit)}$ of the motor current, the drive motor is operated using the motor control means with a variable frequency such that the motor current I remains constant. The term motor current mentioned above designates the motor drive current which flows through the stator windings of the motor. In this second load region, a certain value of the motor current I is controlled by changing the frequency. In a preferred further development of the electric tool device, the motor control means is designed such that the motor current is kept at the constant value $I_{(limit)}$ during this second phase.

In a further preferred embodiment of the invention, the motor control means is designed such that the voltage applied to the motor (motor drive voltage) is also kept at a constant value during this second phase.

The motor control means is preferably designed such that the voltage applied to the motor is kept at a constant, in particular, same value during the first and second phases.

To perform the above-mentioned control process, it has proven to be advantageous if the current detector comprises a shunt resistance which can preferably be used directly via a voltage tap as a current measuring means.

It has also proven to be advantageous, in dependence on the design of the required motor performance, if the value of the limit current $I_{(limit)}$ is selected to be between 4 and 20 amperes, in particular between 10 and 15 amperes.

It is also suitable if the frequency converter, the motor control means, and the current detector which detects the motor current are designed on a common plate and/or disposed in a closed electronic housing and can be built in the form of one single construction unit.

In a further particularly important embodiment of the invention, the motor control means is designed such that, during a third motor operation phase in which the motor current can no longer be kept constant merely by reducing the motor current frequency with further increasing load, the motor voltage is also reduced. If the above-described motor control meets its limit during the second phase in response to further increasing load, further reduction of the frequency can no longer keep the motor current constant and the motor encounters its control limits. A further development of the invention proposes to change, i.e. reduce the frequency and also the motor voltage. In consequence thereof, the motor rotational speed decreases considerably and the user quickly notices that the motor is overloaded and can correspondingly decrease the load to thereby prevent tilting of the motor.

In a further design of this inventive concept, the motor control may be designed such that when a motor voltage $U_{(limit)}$ has been reached during the third phase, the motor is switched off. Instead of switching off the motor, a residual excitation can be applied to the motor to ensure that the motor can restart automatically after elimination of the load to thereby resume normal control operation.

The invention also concerns a method for operating a manual electric tool device comprising an asynchronous electromotor or a brush-less synchronous electromotor and a computer-controlled motor control means as indicated in the independent method claim. Preferred embodiments of this inventive method can be extracted from claims dependent on that independent method claim.

Use of the inventive electric tool device and performance of the inventive method for operating an electric tool device may produce motor performance characteristics to which a user of electric tool devices with a carbon brush commutator system, so-called universal motors, is accustomed, without using such a commutator carbon brush system which is susceptible to wear. On the other hand, it has proven to be advantageous that despite use of asynchronous electromotors or brush-less synchronous electromotors, the "tilting" of the motor, which is common per se, can be prevented. The motor is always driven at a point of operation which is optimum for the instantaneous load through selection of the optimum frequency.

Further features, details and advantages of the invention can be extracted from the following claims and the drawing and subsequent description of a preferred embodiment of the invention.

DESCRIPTION OF THE PREFERRED EMBODIMENT

Figure 1:
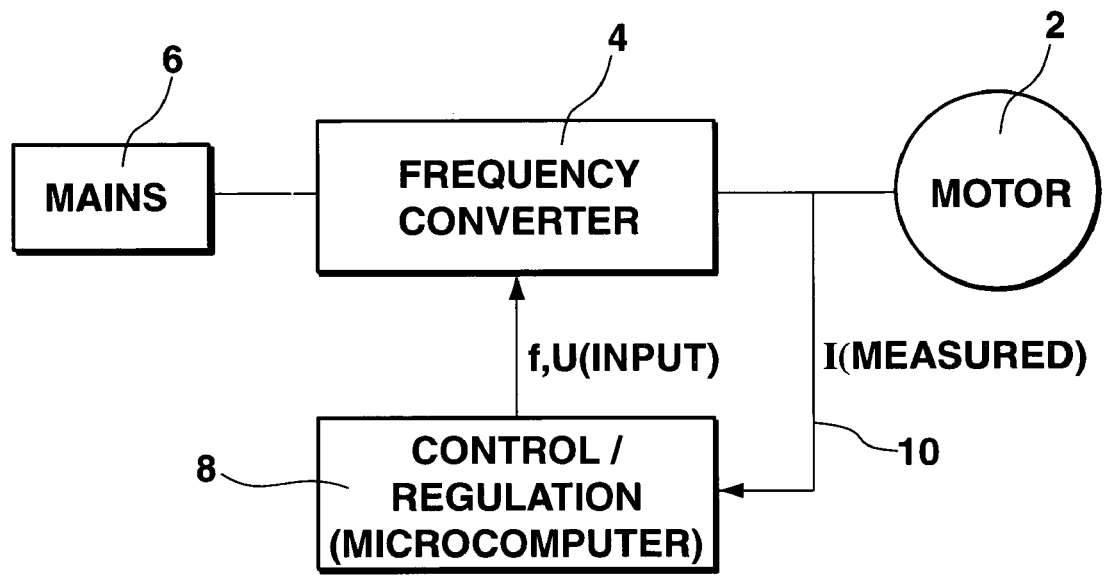
FIG. 1 shows a schematic view of the circuit of an inventive manual electric tool device.

FIG. 1 schematically shows the basic construction of the motor control of an inventive electric tool device. The motor 2, an asynchronous electromotor or a brush-less synchronous electromotor, is connected to a frequency converter 4 fed via a mains voltage, from which it receives the motor supply or motor excitation voltage. The frequency converter 4 is connected to the normal mains supply 6 with e.g. 230V/50 Hz. A micro-processor operated motor control means 8 is also provided which controls the frequency converter 4 and provides the specifications for the frequency of the motor drive voltage and for the value of the motor drive voltage, to the frequency converter 4. A current detector 10 is moreover provided in a respective control line between the frequency converter 4 and electromotor 2. It may preferably be a shunt resistance 12 for generating a value corresponding to the motor current via electronic tap switches (known per se and not shown), which can be fed to the motor control means 8 as an initial value. The frequency converter 4, the motor control means 8 and the current value detector 10 with circuit (not shown) are disposed or housed as a construction unit in an electronic housing which is protected from moisture.

Figure 2:
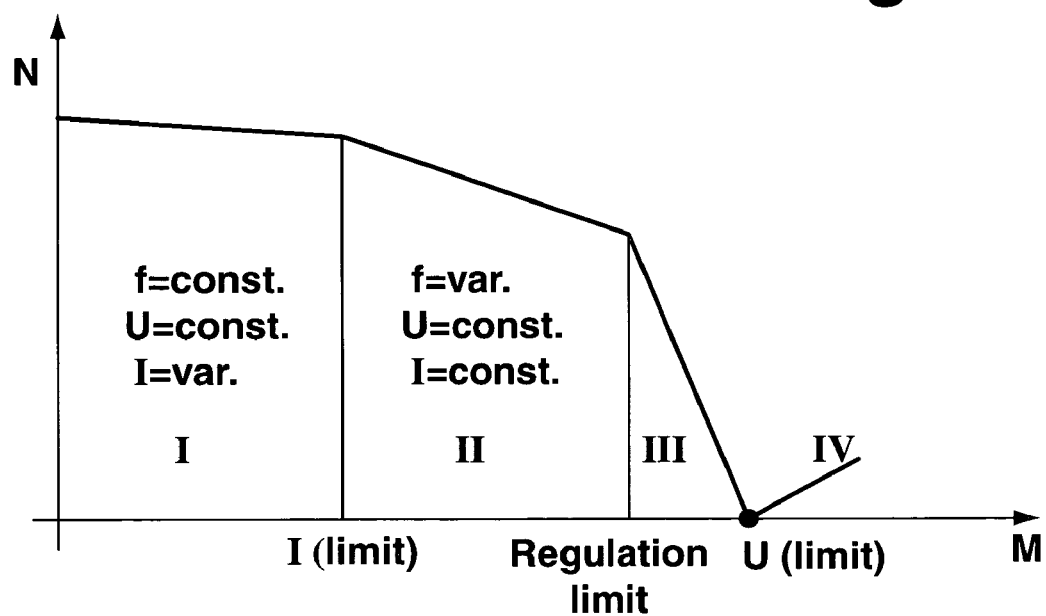
FIG. 2 shows a motor diagram plotting the motor rotational speed N versus the motor torque M.

FIG. 2 shows a motor diagram, in which the motor rotational speed N is shown as a function of the motor torque M, i.e. as function of the load on the electromotor. The frequency of the motor excitation voltage and the value of this voltage are kept constant up to a limit current $I_{(limit)}$. The electromotor is operated with approximately constant torque N in the region designated with I.

As the motor current increases due to increasing load past the limit value $I_{(limit)}$, the frequency of the motor drive voltage is controlled through the motor control means such that the motor current I remains constant, preferably at the limit value $I_{(limit)}$ which is between 10 and 20A, in particular between 10 and 15A and preferably e.g., for a right angle grinder motor, at 12 to 14 A. With increasing load, the frequency of the motor excitation voltage applied to the motor via the frequency converter and therefore also the motor rotational speed M decrease. One therefore obtains approximately the characteristics of a commutator motor outside of the region which can be controlled. The inventive electric tool device will behave in a manner familiar to the users of devices having universal motors, i.e. the rotational speed of the motor decreases noticeably with increasing load. This region is designated with II in FIG. 2.

If the load continues to increase, the control limit is reached at the end of the region II, and the motor current can no longer be kept constant merely through reduction of the frequency of the motor excitation voltage. In a further development of the invention, the frequency and also the voltage are reduced to be able to keep the motor current I at the same level. In the region of the motor diagram designated with III, the characteristic curve drops drastically, i.e. the motor rotational speed N decreases considerably with load, such that a user easily recognizes that the motor rotates in the overloaded state and can appropriately reduce the load. This control in the region III prevents tilting of the motor. When a limit voltage $U_{(limit)}$ has been reached, the motor is switched off for safety reasons, since the motor current could otherwise no longer be kept constant. Alternatively, a low residual voltage can be maintained such that when the load is removed, the motor can slowly restart operation and automatically return to the region which can be controlled.

I claim:

1. An electric tool device, the device comprising:
    an electromotor, said electromotor being one of asynchronous or brush-less synchronous;
    a motor control means, said motor control means having computer control;
    a frequency converter which can be controlled by said motor control means for applying a drive voltage to said motor; and
    a current detector which detects a motor current and which communicates with said motor control means, wherein said motor control means is designed such that, in a first phase of motor operation at motor currents of up to a limit current $I_{(limit)}$, the voltage applied to said motor and the frequency of the motor current are kept constant and, in a second phase of motor operation at loads above that load at which the motor current reaches the limit current $I_{(limit)}$, the voltage applied to said motor is kept constant and the frequency of the motor current is reduced to such an extent that the motor current is kept at a constant value.

2. The electric tool device of claim 1, wherein the device is a manual electric tool device.

3. The electric tool device of claim 1, wherein said motor control means is designed such that the motor current is kept at the constant value $I_{(limit)}$ during the second phase.

4. The electric tool device of claim 1, wherein said motor control means is designed such that the voltage applied to said motor is kept at a same value during the first and second phases.

5. The electric tool device of claim 1, wherein said current detector comprises a shunt resistance.

6. The electric tool device of claim 1, further comprising a housing in which said frequency converter and said motor control means are disposed.

7. The electric tool device of claim 1, wherein said limit current $I_{(limit)}$ is selected between 4A and 20A.

8. The electric tool device of claim 7, wherein said limit current $I_{(limit)}$ is selected between 10A and 15A.

9. The electric tool device of claim 1, wherein said frequency converter and said motor control means are formed on a common plate or are disposed in a closed electronic housing.

10. The electric tool device of claim 1, wherein said motor control means is designed such that, during a third phase of motor operation in which the motor current cannot be kept constant merely by reducing the frequency or the motor current, the motor voltage is also lowered.

11. The electric tool device of claim 10, wherein said motor control means is designed such that, when a motor voltage $U_{(limit)}$ has been reached during the third phase, said motor is switched off.

12. The electric tool device of claim 10, wherein said motor control means is designed such that, when a motor voltage $U_{(limit)}$ has been reached during the third phase, instead of switching off said motor, a residual excitation is applied to said motor to ensure that said motor automatically starts again after elimination of the load.

13. A method for operating an electric tool device or a manual electric tool device, the device comprising an asynchronous electromotor or a brush-less synchronous electromotor and with a computer-controlled motor control means, the method comprising the steps of:
 a) during a first phase of motor operation under low load at motor currents up to a limit current $I_{(limit)}$, a voltage applied to the motor and a frequency of motor current is kept constant; and
 b) during a second phase of motor operation at loads above that load at which the motor current reaches the limit current $I_{(limit)}$, the voltage applied to the motor is kept constant and the frequency of the motor current is reduced such that the motor current is kept at a constant value.

14. The method of claim 13, wherein the motor current is kept at the constant value $I_{(limit)}$ during the second phase.

15. the method of claim 13, wherein the voltage applied to the motor is kept at a constant value during the second phase.

16. The method of claim 13, wherein the voltage applied to the motor is kept constant during the first and second phases.

17. The method of claim 16, wherein the motor voltage is kept at a same value during the first and second phases.

18. The method of claim 13, wherein the limit current $I_{(limit)}$ is selected between 10A and 20A.

19. The method of claim 18, wherein the limit current is between 10A and 15A.

20. The method of claim 13, wherein, during a third phase of motor operation in which the motor current cannot be kept constant merely by reducing the frequency of the motor current, the motor voltage is also reduced in response to further increasing load.

21. The method of claim 20, wherein, when a motor voltage $U_{(limit)}$ has been reached during the third phase, the motor is switched off.

22. The method of claim 20, wherein, when a motor voltage $U_{(limit)}$ has been reached during the third phase, instead of switching off the motor, a residual excitation is applied to the motor to ensure that the motor automatically starts again after elimination of the load.

* * * * *